Dec. 24, 1935.   B. BANNISTER   2,025,146
METHOD AND APPARATUS FOR THE MANUFACTURE OF SEAMLESS TUBES
Filed March 14, 1933   4 Sheets-Sheet 1

Inventor:
BRYANT BANNISTER,
by: Usina & Rauber
his Attorneys.

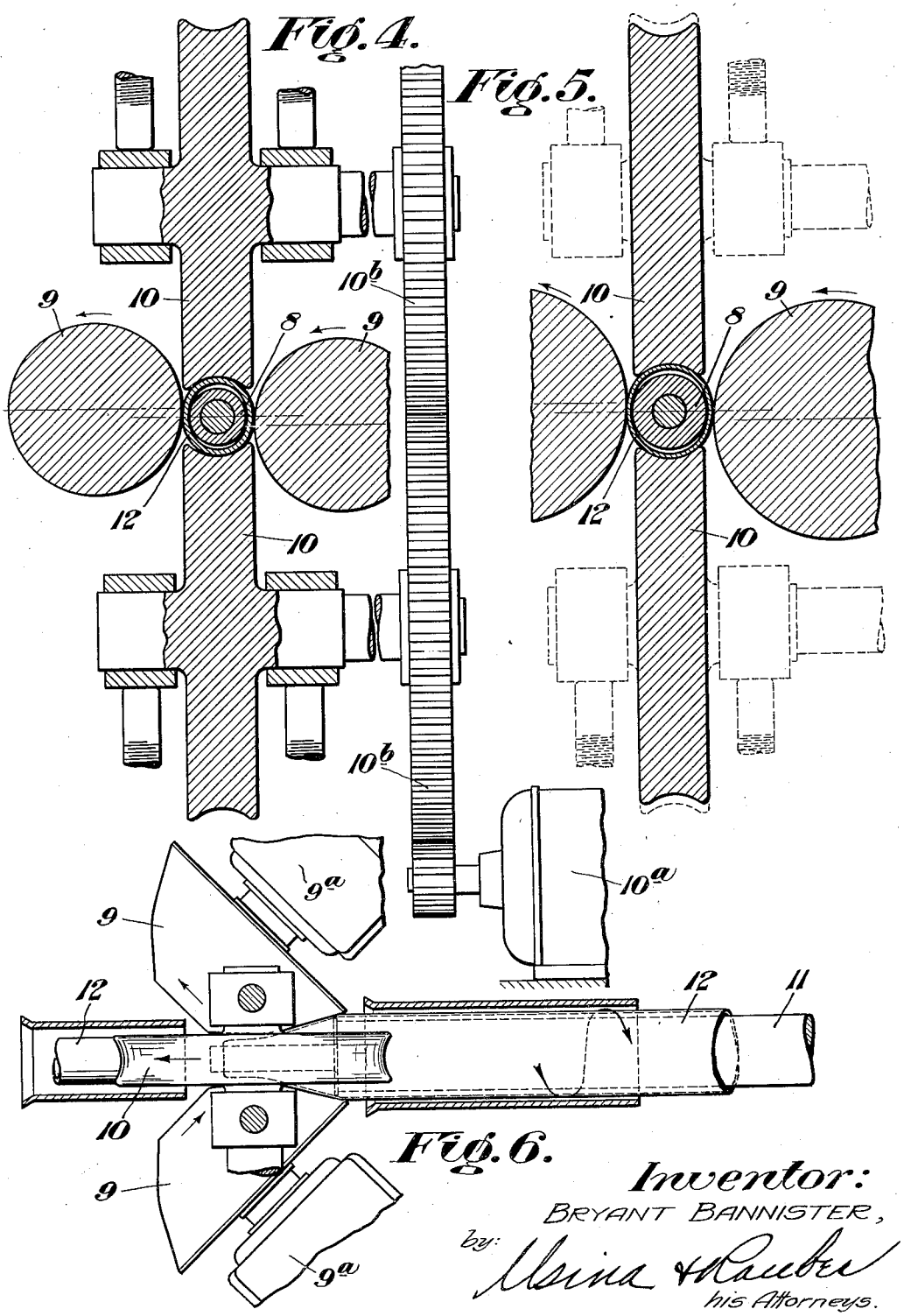

Dec. 24, 1935.  B. BANNISTER  2,025,146
METHOD AND APPARATUS FOR THE MANUFACTURE OF SEAMLESS TUBES
Filed March 14, 1933  4 Sheets-Sheet 3

Inventor:
BRYANT BANNISTER,
by: *Usina & Lauber*
his Attorneys.

Dec. 24, 1935.  B. BANNISTER  2,025,146
METHOD AND APPARATUS FOR THE MANUFACTURE OF SEAMLESS TUBES
Filed March 14, 1933  4 Sheets-Sheet 4
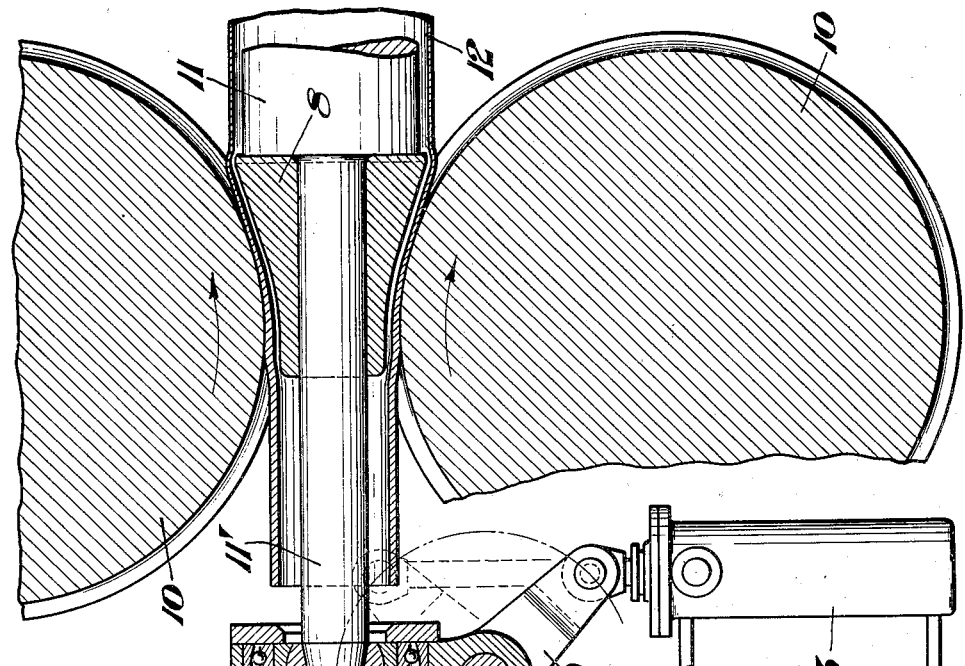
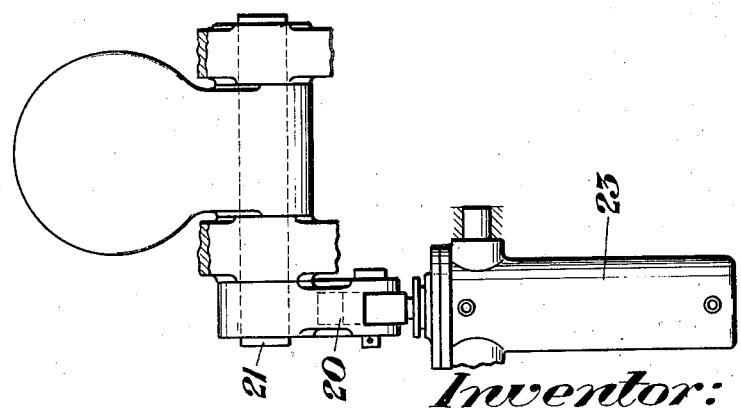
Inventor:
BRYANT BANNISTER,
by Usina & Lauber
his Attorneys.

Patented Dec. 24, 1935

2,025,146

UNITED STATES PATENT OFFICE 2,025,146

METHOD AND APPARATUS FOR THE MANUFACTURE OF SEAMLESS TUBES

Bryant Bannister, Mount Lebanon, Pa.

Application March 14, 1933, Serial No. 660,716

3 Claims. (Cl. 80—13)

This invention relates to the manufacture of seamless tubes, and particularly to the procedure in such operations, wherein the diameter of the previously pierced billet or work-piece is increased and the wall thickness thereof is reduced.

In the present procedure of commercially manufacturing seamless tubes, the rough tube delivered from the expanding pass varies considerably in diameter and in wall thickness and it may be said that neither the size of the tube nor the thickness of its wall is under control. Under such conditions, the tube cannot always be successfully finished to the desired dimensions.

The commercial operation, as usually carried out, consists of forcing the heated and previously pierced work-piece over a mandrel plug held in position at the end of a long bar. The bar and plug are free to rotate but are held rigidly against axial movement. The work-piece is forced over the plug by means of two driven rolls which, in cooperation with the plug, grip the walls of the work-piece and reduce the wall thickness thereof by reason of the rolling action between each roll and the plug. The rolls are so located with relation to the plug or the piece, and are so driven that the work-piece is not only rotated by their cooperative action but is also propelled longitudinally of itself, viz., over the plug and along the bar holding the plug.

This operation not only decreases the wall thickness of the piece but also increases its diameter. This results from the fact that the plug and the rolls are so shaped that the work-piece must expand, or increase in diameter as its wall thickness is reduced.

The wall thickness of the work-piece, delivered to the expanding mill, varies and, due to this variation, the perimeter of the work-piece may increase more rapidly than is necessary to prevent binding and sticking upon the plug. That is to say, the operation of the rolls and the plug in the expanding pass causes the work-piece to assume an oval shape and, inasmuch as the spacing between each roll and the plug is constant for definite positions throughout the pass, it will be apparent that this ovality will vary, depending upon the variations in the wall thickness of the work-piece. This might be expressed in terms of perimeter, since it is apparent that a portion of the work-piece having thicker walls than other portions will, by reason of the fixed relations between the rolls and the plug at any particular point in the pass, be extended in a peripheral direction more than other portions of less wall thickness. In an attempt to control the perimeter or the peripheral growth of the work-piece during the expanding operation, it is customary to employ stationary guide blocks which are arranged intermediate the rolls, circumferentially of the piece being acted upon, and these guide blocks, to some extent, limit the perimeter, or the peripheral extension of the piece, by contacting with the piece. It may be said that these guide blocks resist an undue extension of the perimeter of the piece or compel the perimeter to remain within certain limits. Guide blocks wear rapidly and this wear is of sufficient extent as to appreciably vary the perimeter limiting effect occasioned by them.

In addition, the blocks tend to upset and thicken the wall of the work-piece because of the resistance they offer to the free rotation and translation of the piece. The action of these guide blocks upon the surface of the work-piece is also extremely severe and, at times, occasion a badly scored surface.

The present invention relates both to a method of procedure and apparatus for carrying forward such procedure. The means or the apparatus for accomplishing the expansion of a work-piece may be generally termed the expanding pass and, as illustrated and described herein, includes driven working rolls similar to the working rolls heretofore described, which cooperate with a bar supported plug. This plug may, however, be supported by a tension or a compression bar and the relationship between the contour of the plug and the working face of each roll is, as will hereinafter be described, a special relationship. These rolls, hereinafter termed working rolls, are preferably of the disk type although other types may be employed. In addition to the working rolls, two power driven grooved rolls are employed. These rolls may be termed guide rolls and are located intermediate the working rolls, peripherally of the piece being worked upon; are so arranged that the piece is engaged by the grooved portion of each roll; and are driven at a peripheral speed far in excess of the axial speed of the work-piece in the direction of its travel over and around the plug. That is to say, the peripheral speed of the guide rolls is far in excess of that of the working rolls. In addition, the axes of the guide rolls are located approximately, although not necessarily, in a plane at right angles to the axis of the work-piece, or to say it more broadly, the axes of the guide rolls extend across the line of direction of the work-piece in moving through the pass.

However, these guide rolls may have their axes at an angle to the longitudinal direction of feed of the work-piece, and in this case the groove may be omitted from the periphery of the rolls.

An object of the invention is to produce a new and improved method of expanding seamless tubing in which better control of the perimeter and of the tube diameter is obtained than has heretofore been possible in connection with commercial apparatus now in use and known to me.

A further object is to produce new and improved apparatus for expanding seamless tubes in which means are employed for preliminarily controlling the wall thickness of the work-piece while controlling the perimeter thereof and in this way insuring the manufacture of seamless tubing of substantially definite diameters and wall thicknesses and of substantially uniform diameters and wall thicknesses from end to end.

A further object is to produce a method of procedure in the expanding of a previously pierced billet in which the expanding operation is preceded by what may be termed a wall gaging operation during which the perimeter of the workpiece is under control, and which is immediately followed by an expanding operation, the major portion of which is under perimeter control.

A further object is to produce a new procedure as above, in which each increment of the tube is gaged for wall thickness while its perimeter is under control and in which the wall thickness of preceding and gaged increments are simultaneously reduced while the perimeter thereof is under control, and then further reduced under conditions such that the diameter of the tube is increased.

A still further object is to produce new and improved apparatus for accomplishing the expansion of a previously pierced billet or a previously worked seamless tube.

These and other objects are attained by means of the method herein illustrated and described in connection with the apparatus herein illustrated and described.

In the drawings accompanying and forming a part hereof, Figure 1 is a vertical sectional view of apparatus embodying my invention, in which the sectional plane is defined by the axis of the work-piece and the expanding plug and discloses the relationship of the work-piece, the plug and the guide rolls as the work-piece moves through the expanding pass.

Figure 4 is a sectional view taken along the line IV—IV of either Figure 1 or 2.

Figure 5 is a corresponding sectional view, but taken through a later portion of the pass, as for example, along the line V—V of Figure 1.

Figure 6 is a more or less diagrammatic plan view of the apparatus illustrated in the preceding figures.

Figure 2:
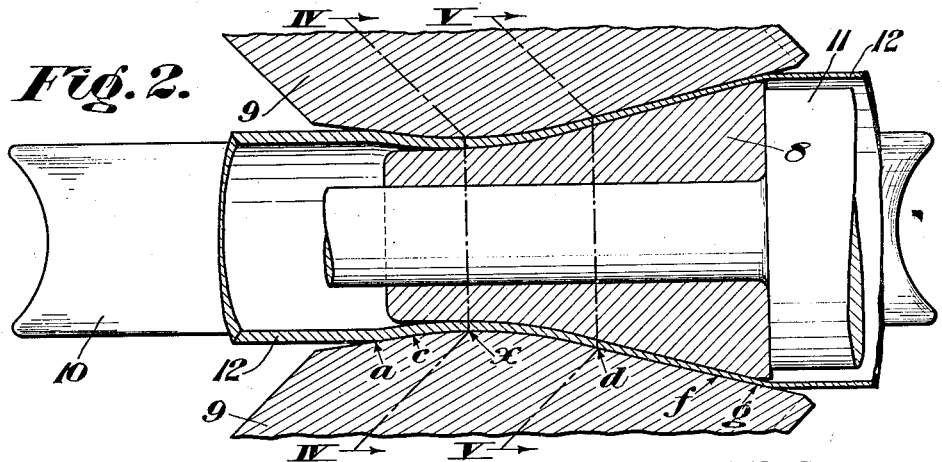
Figure 2 is a sectional view taken on a warped plane which is approximately horizontal. The plane of this section is warped so as to disclose the entire line of contact between the working rolls, the work-piece and the plug throughout the entire pass.
Figure 7:
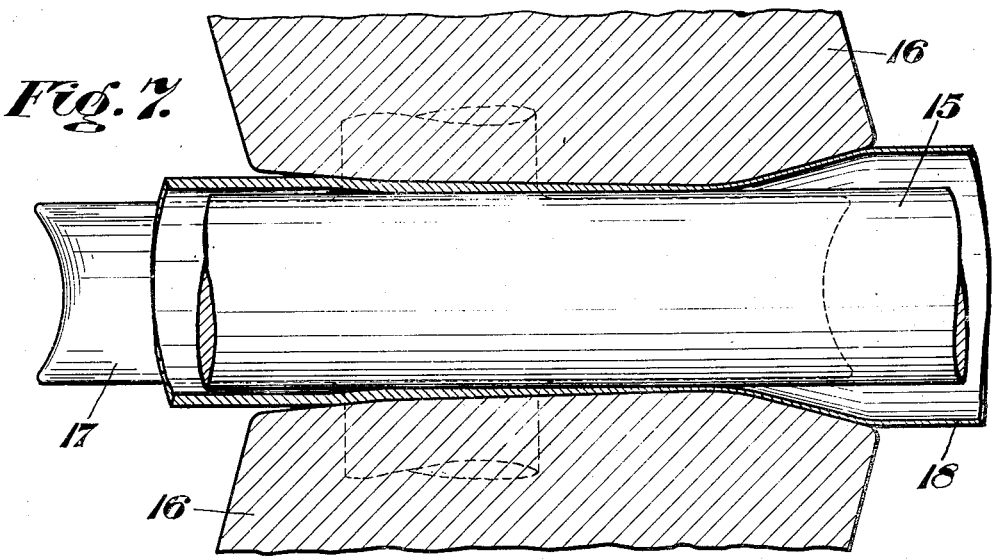
Figure 7 is a view corresponding to Figure 1 but illustrating a modified form of apparatus for carrying out my invention, in which the plug of Figures 1 to 6 is replaced by a floating mandrel.
Figure 8:
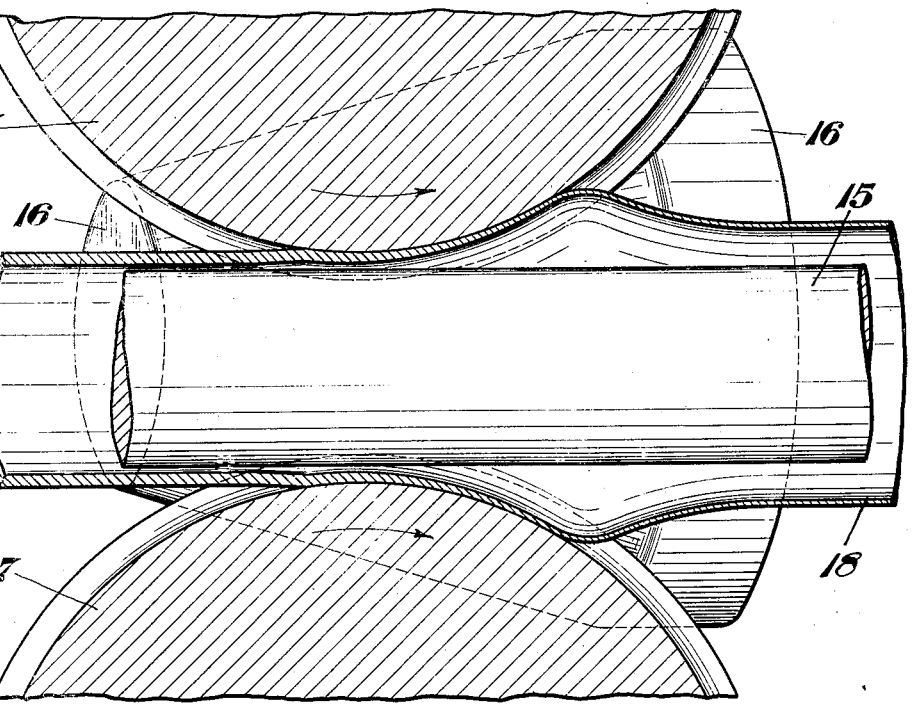

Figure 8 is a view corresponding to Figure 2 but illustrating the relationship between the work rolls and the floating mandrel shown in Figure 7. The plane along which this view is taken is a warped plane which is approximately horizontal, and is employed for the purpose of disclosing the line of contact between the work rolls and the piece and between the piece and the mandrel throughout the pass; and, Figure 9 is a diagrammatic view, shown partially in section, of a detail which may be employed in connection with the apparatus illustrated.

As illustrated in Figures 1 to 6, inclusive, the apparatus primarily consists of a fixedly mounted plug 8, a pair of working rolls 9, which are located on substantially opposite sides of the plug and suitably driven as by means of motors 9ª. A pair of guide rolls 10 are preferably located diametrically opposite each other with relation to the plug and each roll is located at an intermediate position between work rolls 9, circumferentially of the plug. The guide rolls 10 are suitably driven as by means of motor 10ª and gearing 10ᵇ.

The plug 8 is held firmly in position with relation to the work rolls 9 and the guide rolls 10 by means of a support bar 11 and, as stated, this bar may either be a compression or a tension bar. That is to say, the bar may either be anchored and supported on the delivery side or on the receiving side of the pass and, in any event, extends through the work-piece as that piece is traversing the pass. The plug and bar are rotatably mounted so that they are capable of turning about the longitudinal axis during the expanding operation. The work-piece is shown in fragmental section in Figures 1 and 2, in transverse sections in Figures 4 and 5 and in plan in Figure 6. In all these views the work-piece is designated by the numeral 12.

As stated, the working rolls 9 may be of the disk or cone type and are so illustrated. While the axes of the two working rolls converge, they do not intersect since the working rolls are so positioned that the axis of one working roll defines a horizontal plane which is parallel to but above the horizontal plane defined by the longitudinal axis of the plug, and the axis of the other working roll defines a horizontal plane which is parallel to but below the longitudinal axis of the plug.

With this arrangement it will be apparent that the vertical planes defined by the axes of these two working rolls intersect and the line of such intersection preferably intersects the longitudinal axis of the plug. Because of this relationship between the working rolls and the plug, one working roll may be termed the high roll and the other one may be termed the low roll, but in any event, the relationship is such that the piece is rotated and also propelled through the pass by the conjoint action of the rolls and each point of the work-piece therefore travels in a helical direction by reason of the action of the working rolls.

The guide rolls 10 are shown with their axes located at right angles to the longitudinal axis of the plug. As stated, this is not absolutely essential and the guide rolls can be turned and under some circumstances may be turned at an angle to the direction of longitudinal travel of the piece through the pass. This slight canting of the guide rolls can be employed to reduce their peripheral speed. Each guide roll is grooved as shown, and the contour of the groove is such as to approximately correspond with the diameter of the work-piece at the time the work-piece moves out of contact with the guide rolls in moving through the pass. These guide rolls, like the working rolls, are power driven but the guide rolls are driven in opposite directions and at such a speed as to produce a peripheral speed considerably in excess of but in the direction of the longitudinal speed of travel of the piece through the pass. The direction of movement of each work roll is such that the direction of its periphery, at the point of contact with the work-piece, is in the general direction of travel of a point on the work-piece moving through the pass.

As illustrated, the receiving end of the plug 8 is of less diameter than the internal diameter of the oncoming work-piece and the spacing of the rolls 9 and the contour of the working faces of those rolls is such that the external surface of the work-piece is engaged by the rolls prior to its engagement with the plug, or at a point ahead of the receiving end of the plug.

The relationship between the external surface of the piece and the contour and the location of the working rolls is such that the first action of the working rolls is to distort the walls of the work-piece by forcing them inwardly toward the axis of the work-piece. That is to say, the first action of the work rolls on the work-piece is to distort the piece to oval form, and this is accomplished without decreasing the wall thickness of the piece. The guide rolls are so positioned with relation to the piece to be acted upon that they act as an extraneous force limiting the ovality of the piece. They are, however, not effective in limiting the ovality until about the time the piece is engaged by the plug. The guide rolls are, as has been said, rotated at a high velocity so that their peripheries in contact with the piece move in substantially the direction of movement of the piece but at a considerably higher speed than the piece moves. Under such condition the ovality limiting force is so applied that it not only does not impose substantial resistance to the rotating movement of the piece but actually assists the piece to move axially and it does not, therefore, tend to increase the wall thickness of the piece. As each increment of the piece moves over the plug it is further distorted by the rolling action between the working rolls and the plug. The relationship between the plug and the working roll contour is such that the piece is finally gripped, in its longitudinal progress, by the working rolls and the plug and in such a way that the wall thickness of the piece is reduced by this cooperative action. In this action, the plug functions as an idler roll or as a rotating anvil. In the early portion of the pass the contour of the working rolls and the plug is such that the working rolls continue to press the successive increments of the piece, acted upon by them, toward the axis of the piece while the cooperative effect of these rolls and the plug is to reduce the wall thickness of the piece. That is to say, the arrangement of the plug and the working rolls is such as to produce a gorge within the pass.

The guide rolls, however, are so located that they present substantially their maximum ovality limiting effect at the gorge and, by reason of the conditions before described, control the perimeter, or the peripheral growth of the piece acted upon by the plug and the working rolls but at the same time do not oppose the helical or rotative movement of the piece with sufficient intensity to have any effect whatever on the wall thickness of the piece.

From the foregoing it will be apparent that as the successive increments of the piece approach the gorge they are acted upon by the working rolls and the plug in such a way as to produce a definite wall thickness in the piece and it may be said that the perimeter limiting effect of the guide rolls occasions a longitudinal growth or extrusion of the piece, at least to such an extent as to take care of such variations in wall thickness as may be encountered in the roughly pierced billet. As the piece progresses through the pass beyond the gorge, its successive increments are acted upon to reduce the wall thickness but at the same time the guide rolls continue to limit the ovality and therefore limit the perimeter.

Figure 3:
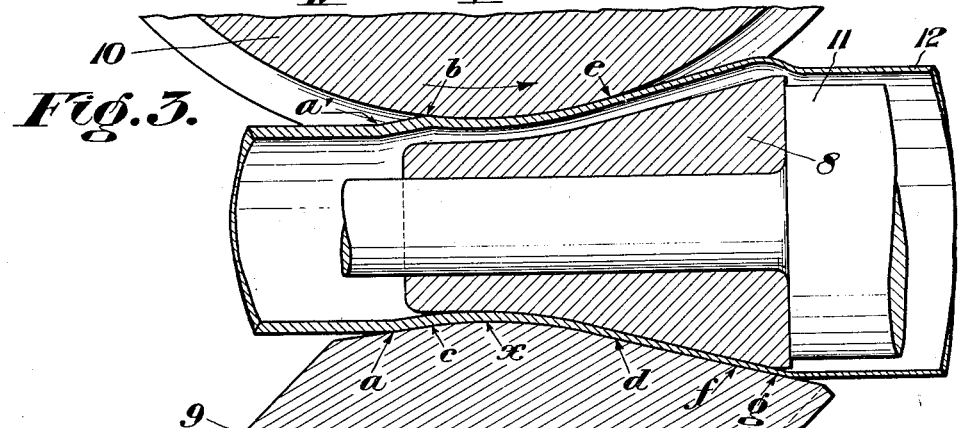
Figure 3 is a composite view of Figures 1 and 2, or a diagrammatic sectional view along a vertical plane defined by the axis of the work-piece, as in Figure 1, and a warped plane, as in Figure 2, and discloses the cooperative relation between the working rolls and the guide rolls.

In this connection it should be noted that the gorge and the preceding portion of the pass in effect limit the rate of feed of the piece through the pass since at, and even preceding the gorge, the pass is limited, both as to the space between the working rolls and the plug and also as to the permissible peripheral growth of the piece, all as shown in Figure 3. That is to say, the combined action of the working rolls, the plug and the guide rolls limit the rate of feed through the pass. Beyond the gorge there is a portion of the pass in which the diameter of the plug does not increase as rapidly as the diameter of the working rolls, with the result that the piece, even after the gorge is passed, is slightly increased in diameter as its wall thickness is decreased.

A reference to Figure 3 will disclose that during this portion of the pass, the reduction in wall thickness is accomplished under the perimeter limiting effect of the guide rolls. The succeeding portion of the pass is so proportioned that the decrease in wall thickness is compensated for by an increase in working piece diameter, so that while the wall thickness is actually decreased the cross-sectional area of the wall is not reduced, with the result that the piece does not increase substantially in longitudinal length throughout this portion of the pass. It will also be noted that as the diameter of the working rolls increase, the diameter of the piece also increases. Under such conditions there is very little peripheral or axial slippage between the working rolls and the surface of the piece being acted upon. This proportional reduction in the wall thickness of the piece continues even after the piece or the increments of the piece have moved beyond the effect of the guide rolls, consequently it will be apparent that throughout the entire operation of expanding or throughout the entire pass, all increments of the piece within the pass are acted upon in such a way as to maintain a definite ovality of the piece and the diameter of the piece and its ovality is always such as to prevent a binding of the piece on the plug but is limited throughout the early portions of the pass so as to produce a piece of fixed wall thickness and fixed perimeter which is further expanded throughout the later portions of the pass.

As shown, the final portion of the pass is of such contour that a reeling action results. Throughout this portion of the pass the surface of the plug and the cooperating surfaces of the working rolls in contact with the piece are parallel, consequently such helical grooves or threads as may have been generated in the piece in the earlier portions of the pass, are removed and the piece is given a smooth and uniform contour.

It will be apparent that in order to effectively accomplish this result, the portion of the pass having parallel opposed surfaces must be of greater length than the amount of axial advance accomplished by the piece as it moves through one-half a revolution, and the pass is so illustrated in the drawings. Where subsequent operations are to be performed on the expanded tube, this reeling section is not required and would therefore be omitted.

The work rolls are so contoured and positioned that they continue to contact with the piece even after the piece has passed beyond the plug but the minor axis of the oval continues to increase and the major axis to decrease, therefore the piece finally assumes a circular cross-section on leaving the pass.

Figure 1:
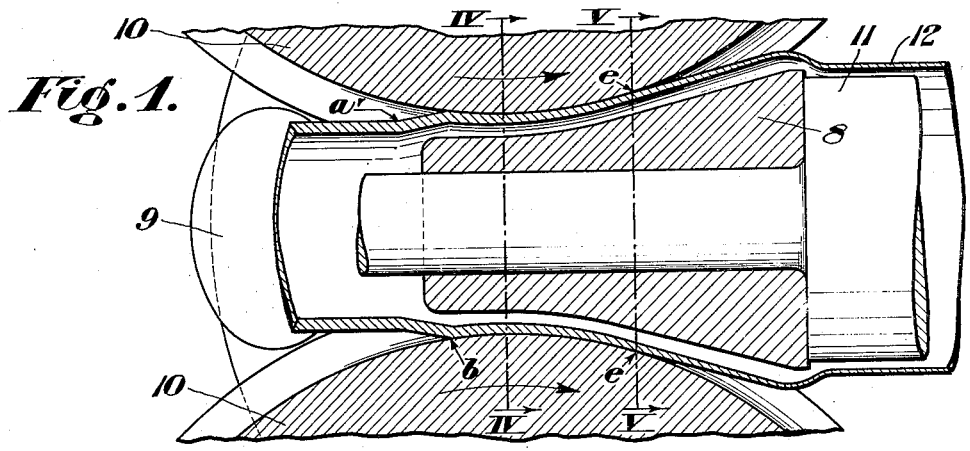

In Figures 1, 2 and 3, I have illustrated the cooperative action of the working rolls, the plug and the guide rolls just described. For example, the reference letter $a$ in Figures 2 and 3 indicates an increment of the work-piece which has just come in contact with the working rolls. $a'$ of Figures 1 and 3 illustrates a correspondingly positioned increment but it will be understood that this latter increment cannot come into contact with the working rolls until it has been moved circumferentially approximately ninety degrees around the axis of the work-piece. The increment $a$ (Figure 2) is unsupported by the plug, consequently the effect of the cooperating working rolls is to distort the work-piece, or in other words, ovality occurs. The grip thus secured upon the work-piece by the working rolls causes the piece to rotate and, as has been said, to move axially or longitudinally through the pass.

This ovality continues to increase as the wall of the work-piece is pressed closer to the axis of the piece by the main rolls and at the point $c$ (Figures 2 and 3) the ovality is such that the increment in question moves into contact with one of the guide rolls 10 about at the point $b$ (Figures 1 and 3) and consequently the guide rolls exercise a perimeter control on the increment and by reason of their position and high peripheral speed in effect limit the perimeter of the work-piece without affecting its wall thickness, thus any excess metal is prevented from entering the pass until it has been reduced to a constant cross-sectional area. There is, however, a decided tendency imparted by the guide rolls to assist the piece into and through the pass. As the increment arrives at the point $c$ in Figures 2 and 3, it is acted upon by both the working roll and the plug and reduction of wall thickness begins. This action continues, and as the increment arrives at the point $x$ (Figures 2 and 3) the wall thickness gaging operation is in effect completed. That is to say, the point $x$ represents the position of the gorge of the pass and the operation on the successive increments of the piece up to this point is, in effect, preliminary operation, in which the wall thickness is definitely determined because of the fixed relationship between the operating surface of the plug and the operating surface of the working rolls, and in which the diameter is definitely determined by the perimeter limiting effect of the rotating guide rolls.

As the increment or successive increments progress through the pass, the wall thickness is progressively decreased and the operation previously described continues till some point $d$ is reached, which may be termed the limit of the profile arc. It will be noted that from the point $c$ to the point $d$ (Figures 2 and 3) the radius of the working roll increases more rapidly than the radius of the piece worked upon and with the arrangement of working rolls described the tendency to feed the piece through the pass in an axial direction increases progressively from the point $c$ to the point $d$, and consequently the velocity of the work-piece can increase between these two points. In order to produce this increase in velocity the working roll and the plug are so positioned and contoured that the cross-sectional area of the work-piece is reduced progressively from $c$ to $d$, resulting in an elongation in this portion of the pass which automatically increases the velocity of axial travel.

As the increment reaches the point $e$ (Figures 1 and 3) the piece loses contact with the guide rolls but since the wall thickness and the perimeter have definite values which are established by the preceding portion of the pass, the further reduction in wall thickness gives a corresponding increase in perimeter and the further expansion is therefore controlled by controlling the extent of further wall reduction.

In connection with the portion of the pass between the points $c$ and $d$, above referred to, it may be stated that the tendency of the rolls to impart an axial velocity to the piece may be designated by the formula $$F = \frac{2yV \sin \beta}{D + z \cos \beta}$$

where
F—the feeding tendency imparted by the rolls in feet per minute;
y—the distance in inches between the horizontal plane through the axis of the plug and the horizontal plane defined by the axis of the working roll, the assumption being that this dimension is the same for the high and the low roll;
V—the peripheral velocity of the working roll in feet per minute at the section of the pass under consideration.
D—the diameter of the working roll in inches at the section under consideration.
z—the equivalent diameter of the work-piece in inches at the section under consideration.
The angle $\beta$ is the angle between the axis of the work roll and the axis of the plug.

This action continues until the increment reaches the point $f$ (Figures 2 and 3) where reduction of wall thickness ceases except for removing helix ridges of metal and the increment in moving from points $f$ to $g$ encounters no further reduction in wall thickness, since the contacting surfaces of the plug and the working rolls are parallel throughout this portion of the path. In this connection it might be stated that by reason of its helical travel, a point on the piece 12, moving from the converging portion of the pass immediately preceding the point $f$ as defined by one working roll, moves into the portion of the pass between the points $f$ and $g$ as defined by the other working roll, and that to this extent, this portion of the pass does effect some reduction, in that it reduces a wall of tapered section into a wall of uniform thickness.

Under such conditions the successive increments, in moving through this portion of the pass, are in effect subjected to a reeling operation, wherein such helical grooves as may have been generated in the earlier portions of the pass are smoothed out and a uniform contour is produced. As the increment arrives at the point $g$ (Figures 2 and 3) it loses contact with the plug and begins to assume a circular section.

That is to say, there is no further reduction in wall thickness and consequently no further increase in diameter reduction and the circular section is obtained as the ovality is reduced. As the increment moves out of contact with the working rolls, the expanded piece or portion of the piece then progresses over the bar 11 and is finally removed from the bar after the entire piece has traversed the pass.

In the above description I have used the term "increment" to define an annular or possibly an oval portion of the work-piece having circumferential length but infinitesimal longitudinal or axial length, and it will be apparent that from the point c to the point d, the successive increments are simultaneously acted upon by the working rolls, the plug and the guide rolls under such conditions that the wall thickness is reduced while the perimeter is limited, but limited under such conditions that there is no tendency toward upsetting or thickening the wall of the increment because of resistance offered to the free rotation of the piece by the perimeter limiting force.

From the foregoing it will be apparent that the work-piece is first brought to a predetermined area of cross-section by the action of properly contoured and positioned working rolls, plug and guide rolls, and under such conditions that while the perimeter is controlled by the guide rolls the walls of the piece are not thickened by this operation. The wall thickness of the piece is then further reduced by reason of the selected contour and positioning of the working rolls and the plug but due to the fact that the piece entering this portion of the pass has a predetermined cross-sectional area, the perimeter of the piece is thereafter controlled by the reduction in wall thickness. The inner surface of the piece may then be smoothed by rolling between parallel surfaces of the working rolls and the plug for a distance greater than the axial travel of the work-piece in moving through one-half revolution.

The procedure above epitomized may be said to include essential steps of my process, although it should be pointed out that the expanding operation is so carried forward that the work-piece is increased in diameter by a larger percentage than its length is increased.

It will be apparent that the position of the guide rolls may be varied with relation to the entrance to the pass as defined by the contours of the plug and working rolls, without departing from the invention herein set forth. For example, where the wall thickness and diameter of the piece delivered to the pass are substantially uniform and of the proper dimensions, the guide rolls may be so set that they contact with the piece throughout the later portion instead of the earlier portion of the pass. That is to say, the guide rolls may be moved rearwardly of the pass so that they contact with increments of the piece which contact with the delivery end of the plug or portions of the plug adjacent its delivery end. Under such conditions the piece, when first acted upon by the combined action of plug and working rolls, will be reduced in wall thickness, and consequently there will be some increase in diameter but under the assumed conditions this increase in diameter will be controlled by, and will be proportional to the decrease in wall thickness. In the remaining portion of the pass or that portion in which the increments of the piece are simultaneously in contact with the guide rolls, the plug and the working rolls, the plug and the working rolls may be so contoured as to occasion a considerable reduction in cross-sectional area, and this reduction will be accomplished under the perimeter limiting effect of the guide rolls and will result in a corresponding increase in the length of the piece.

In Figures 7 and 8 I have shown a modified form of apparatus for carrying out the procedure heretofore described. As there shown, the plug 8 is replaced by a floating mandrel 15 and the contour of the working face of each working roll 16 is of course changed to compensate for the fact that the working face of the mandrel is a plain cylindrical surface. The guide rolls 17 are substantially as described in connection with Figures 1 to 6 and are driven at the speeds previously indicated.

In operation, the mandrel 15 is placed in the pierced billet or previously processed work-piece 18. The mandrel is of less external diameter than the internal diameter of the work-piece and consequently lies within the work-piece as it and the work-piece approach the pass. The working rolls 16 first engage the piece and distort it or, as has been said, occasion some ovality. As the ovality increases the mandrel becomes effective as an idler roll or rotating anvil between which and each working roll the wall thickness of the piece is reduced while the ovality is maintained.

It will also be apparent that while the mandrel moves axially with the work-piece it is free to rotate with that piece and it, together with the working rolls, defines what may be termed the active pass. That is to say, the diameter of the mandrel taken in conjunction with the positioning of the working rolls and the contour of the working faces of those rolls, define the active pass or the space through which the wall of the work-piece is rolled or compressed during the expanding operation. Here, as previously described in connection with the other embodiment of my invention as illustrated in Figures 1 to 6, the wall thickness is first reduced in what may be termed a gaging operation, and then the further reduction of wall thickness is so accomplished that the reduction of thickness is compensated for by the increase in diameter of the piece or by its peripheral growth.

It will be apparent that here the extent of ovality may be more marked than where a plug of the shape of plug 8 illustrated is employed but that the ovality is controlled and the perimeter is limited by the rotating guide rolls under such conditions that the guide rolls oppose little or no resistance to the rotational movement of the work-piece as it traverses the pass. Throughout an appreciable portion of the pass the working faces of the working rolls are parallel with the working face of the mandrel, and this condition of parallel relationship is of sufficient length to effectively accomplish the reeling operation heretofore described.

In Figure 9 I have illustrated a detail of the apparatus illustrated in Figures 1 to 6 inclusive. As there stated, the mandrel support bar 11 may be either a compression bar or a tension bar. I have, however, illustrated it as a compression bar. It will be apparent that as the work-piece is traversing the pass, the plug, and consequently the plug end of the bar 11, is supported by the guide rolls 10 and the piece 12 which envelops the plug. However, as the piece leaves the pass the plug is deprived of the support derived from the piece and because of the flexibility of the bar 11 would tend to drop down onto one or the other of the rolls constituting the pass. To avoid this I have provided a temporary support for the free end of the bar 11 which may be rendered automatic in its action by suitable mechanisms and which is adapted to move into position to receive and support the free end of the bar extension 11', on which the plug 8 is mounted.

As shown, this mechanism consists essentially of a lever, illustrated in the form of a bell crank lever 20 which is so fulcrumed at 21 that it is capable of swinging from a position out of the line of travel of the piece 12 to such a position that it will engage and support the extension 11'. For this purpose the lever is provided with a socket 22 so formed that it will receive and support the end of the extension 11' as the lever is moved to the position illustrated in Figure 9.

Any suitable means may be employed for actuating the supporting lever 20 but in the drawings I have illustrated a pneumatic cylinder 23, having a piston therein which is suitably connected to the lever 20. The arrangement is such that the piston may be actuated to swing the lever out of engagement with the bar 11 and to such a position that it does not interfere with the normal operation of the pass. The intent, however, is to throw the lever into engagement with the extension 11' as soon as the piece traversing the pass moves beyond the free end of the extension. This may be accomplished in a number of ways as, for example, the delivery of pneumatic pressure to the cylinder 23 for thus actuating the lever may be controlled through the agency of a pilot valve (not shown) by a trip finger engaging the external surface of the work-piece traversing the pass and so located that the piece will move from under the finger at such a time as to throw the lever 20 into the bar engaging position. An electric eye trained on the work-piece or associated with a beam of light which is intercepted by the work-piece may take the place of the trip finger described and, by suitable mechanism, may actuate the pilot valve.

It will be understood that throughout the foregoing description I have referred to horizontal or vertical planes merely for convenience of description and those skilled in the art will realize that it is not essential to position the working rolls 9 or 16 above and below the pass, and that consequently it is not essential that the guiding rolls be positioned laterally of the pass as illustrated in the drawings.

While I have illustrated and described but two forms of apparatus embodying my invention and for carrying out my improved process herein described, it will be apparent that various changes, modifications, additions and omissions may be made in the apparatus illustrated, and that the steps of the process may be modified, changed or in part omitted, without departing from the spirit and scope of the invention as set forth by the appended claims.

I claim:

1. The method of expanding a pierced billet which consists in reducing the wall of the billet to a predetermined thickness while positively limiting the circumferential growth thereof by the application of longitudinal tension, whereby some elongation results, and then further reducing the wall thickness throughout the remainder of the expanding operation without elongation while permitting unrestrained circumferential growth of said billet.

2. The method of expanding a pierced billet which consists in reducing the cross sectional area of said billet a predetermined amount by limiting the circumferential growth of said billet and simultaneously applying longitudinal tension thereto, and then reducing the wall thickness throughout the remainder of the expanding operation without reducing the cross sectional area of the billet while permitting unrestrained circumferential growth of the billet.

3. Apparatus for expanding seamless tubes comprising a plurality of metal working rolls and a mandrel defining a pass in which the cross sectional area of the work piece is first reduced to a predetermined value and the work piece is subsequently expanded with a proportionate decrease in wall thickness, in combination with a power-actuated tensioning and guiding member operating to limit the circumferential growth of the work piece in that portion of the pass in which the cross sectional area is reduced to a predetermined value, the remainder of the pass permitting unrestrained circumferential growth of the work piece in direct proportion to its reduction in wall thickness.

BRYANT BANNISTER.